Jan. 13, 1931.                D. L. BROWN                  1,788,368
                     AUTOMATIC VALVE FOR GAS LINES
                     Filed Feb. 27, 1930      2 Sheets-Sheet 1
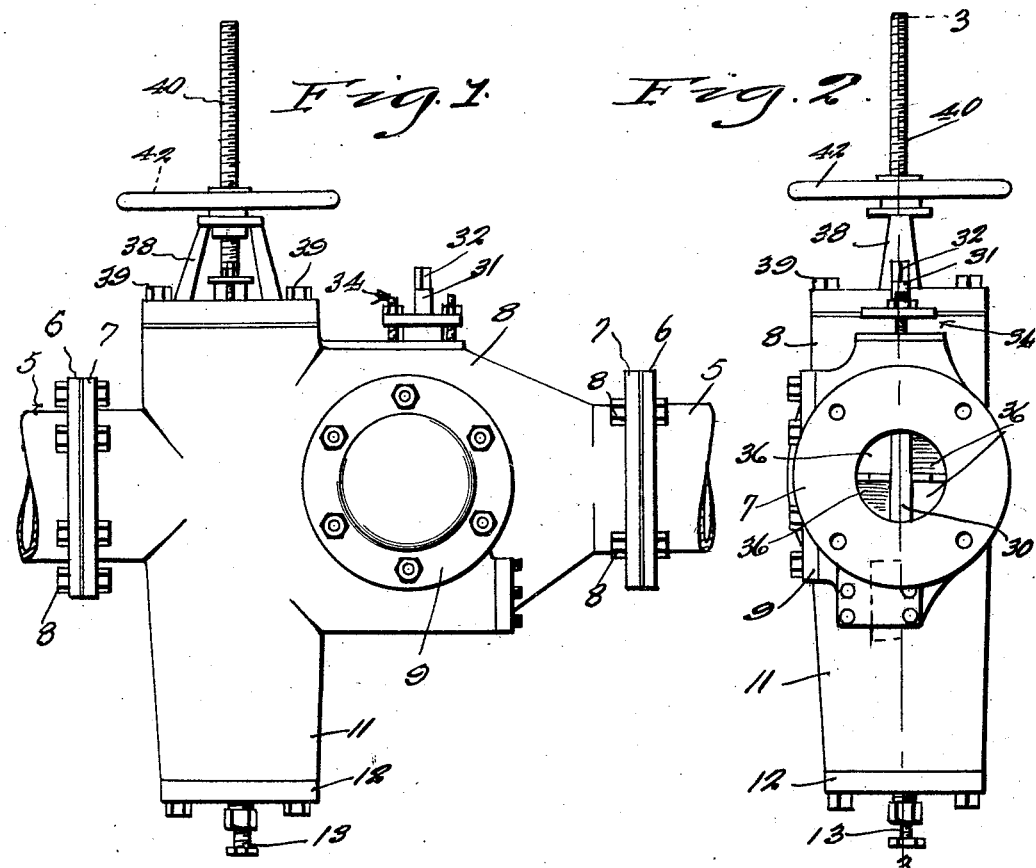
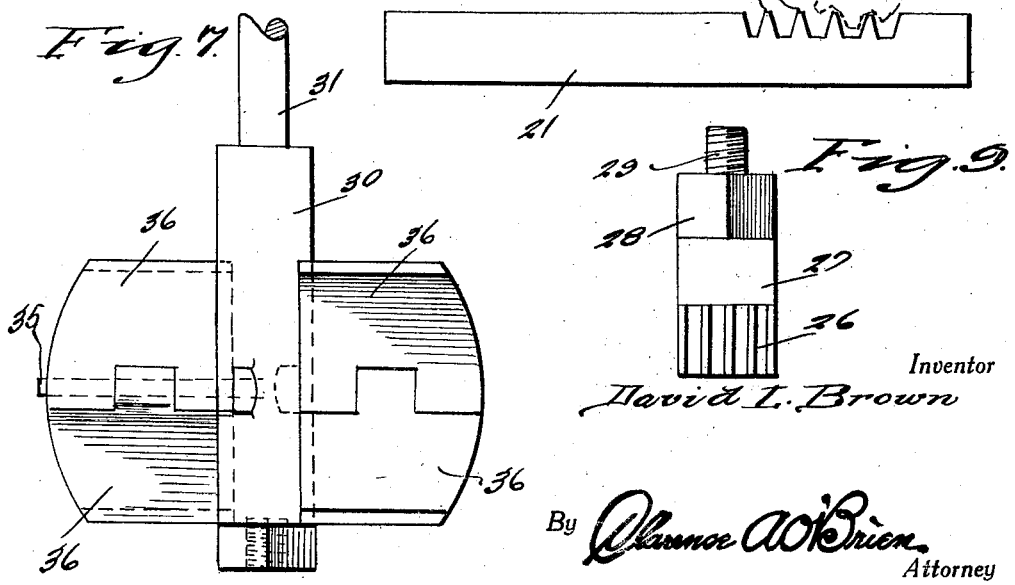
Inventor
David L. Brown
By Clarence A. O'Brien
                    Attorney

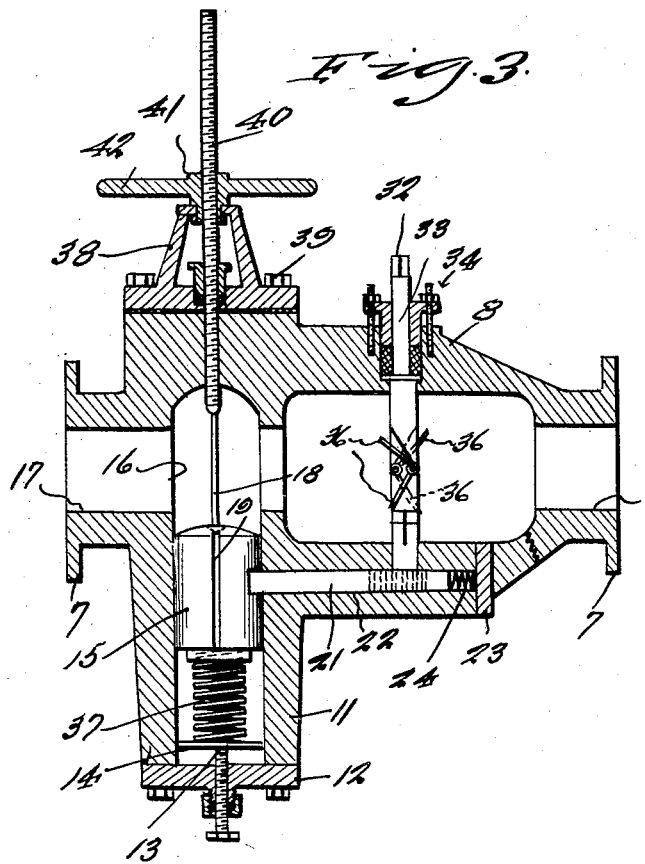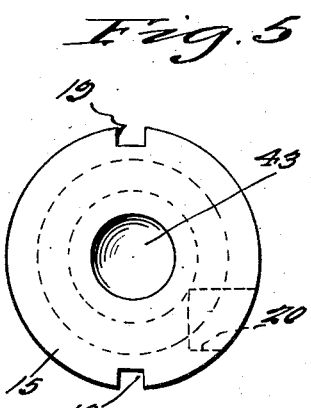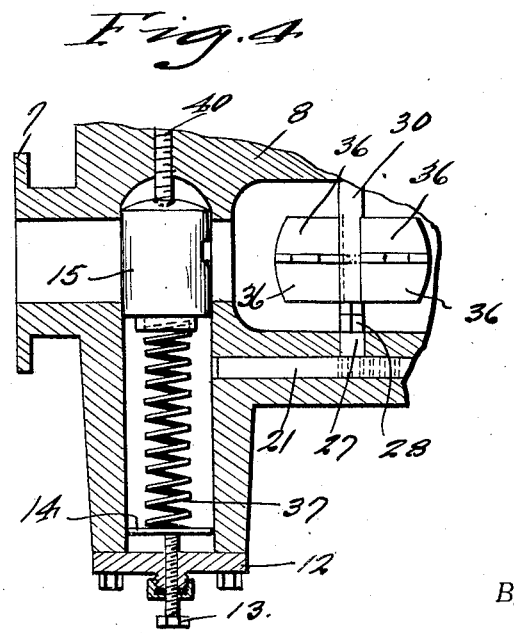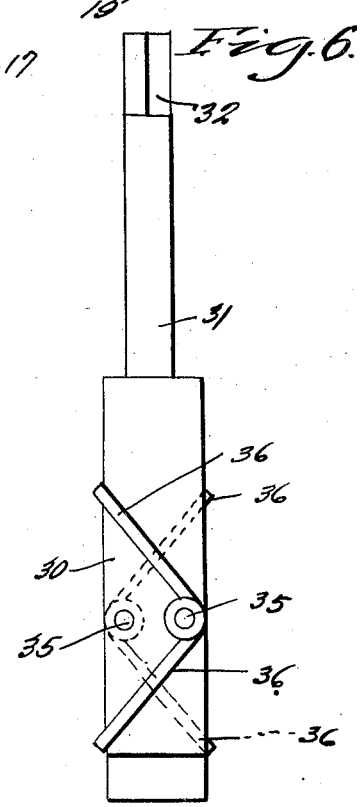

Patented Jan. 13, 1931

1,788,368

UNITED STATES PATENT OFFICE

DAVID L. BROWN, OF WELLSTON, OKLAHOMA, ASSIGNOR OF TWO-FIFTHS TO GEORGE ACUFF, OF OKLAHOMA CITY, OKLAHOMA

AUTOMATIC VALVE FOR GAS LINES

Application filed February 27, 1930. Serial No. 431,838.

This invention relates to valves for gas lines. The present invention relates to new and useful improvements in valves of the type employed in long distance gas lines, the present invention having as its principal object, the provision of means for quickly shutting off the pipe line when a break occurs therein by reason of contraction in cold weather or because of other conditions, permitting the gas to escape with great velocity.

In present day pipe lines, an enormous pressure is required to effect the passage of the gas between remote points, and under this enormous pressure, considerable gas can escape when a break occurs before the conventional shut off types of valves found now in use, can close, causing considerable property damage and frequent personal injuries and loss of life.

Therefore, another important object of the invention is to provide a valve constructed in such a manner as to be capable of closing against the enormous pressure now utilized in an almost instantaneous operation.

In the following specification and claims, other important objects and advantages of the invention will more readily become apparent to the reader.

In the drawings:—

Figure 1 represents a side elevational view of the novel valve.

Fig. 2 represents an end elevation of the novel valve structure.

Fig. 3 is a vertical sectional view thru the valve structure taken substantially on the line 3—3 of Fig. 2.

Fig. 4 is a fragmentary vertical sectional view taken substantially on the same line as is Fig. 3, in Fig. 2, but showing the valve element in line closing position.

Fig. 5 is a top plan view of the novel valve element.

Fig. 6 represents a side elevational view of the bolt impelling means.

Fig. 7 is another elevational view of the bolt impelling means.

Fig. 8 represents a top plan view of the bolt and showing in dotted lines the pinion for mesh therewith.

Fig. 9 is a side elevational view of the pinion and means for connecting the same to the means shown in Fig. 6.

Referring to the drawings wherein like numerals designate like parts, it can be seen in Fig. 1, that numerals 5—5 represent the adjacent ends of a pair of alined pipe sections. Each of these pipe ends is provided with a circumferential flange 6 for opposed disposition with respect to a corresponding circumferential flange 7 on the complementary end of the valve shell 8.

As is clearly shown in Fig. 3, the shell 8 is provided with a depending tubular structure 11, the lower end of which is open and normally closed by the plate 12. Feedable by threads through the closure plate 12 is a screw 13 impinging against the follower 14 slidable within the tubular construction 11.

Also slidable within the tubular construction 11 is the cylindrical valve element 15, and as is clearly shown in Fig. 3, the upper portion of the shell 8, is provided with a bore 16 in continuity with the opening in the tubular construction 11, thus permitting the valve element 15 to slide upwardly into the shell 8 to close off the passageway 17 therethrough, from the pipe sections 5—5.

It can be seen that the wall of the bore 16 is provided with a pair of vertically disposed guide ribs 18 which are received by the longitudinally extending channels 19, at diametrically opposite points on the valve element 15. A bolt end receiving recess 20 is provided in the valve element 15 for receiving the line bolt 21, the latter being slidable through a guideway 22 in the lower portion of the shell 8.

The outer end of the guideway 22 can be opened by removing the detachable plate 23, thus permitting access to the bolt 21. A spring 24 is interposed between the said plate 23, and the outer end of the bolt 21 which tends to urge the bolt 21 inwardly toward the valve element 15.

As is clearly shown in Fig. 8, the bolt 21 is provided with rack teeth 25, which are connected by the gear 26 on the stub shaft 27. The wrench engageable construction 28 is provided on the stub shaft 27 and extending from this construction is a threaded reduced portion 29 which is engageable into the lower portion of the rotatable post 30.

This post 30 has an upwardly extending reduced shaft extension 31, provided with a wrench engageable portion 32 at its upper end. As is clearly shown in Fig. 3, the stub shaft 27 supports the lower end of the post 30, while the shaft portion 31 is journaled through the follower 33 which is included in the packing gland construction, generally referred to by numeral 34.

Projecting in diametrically opposite directions from the post 30 are pins 35—35, each carrying a pair of hingedly connected wings 36—36. These wings are so constructed and assembled on the pins 35—35 as to permit one pair thereof to collapse when the other pair is resisting the pressure in the gas line.

Let it be understood that normally, the pressure in the gas line does not affect the wings on the post 30, but in the event of a breakage in the pipe line, the releasement of the gas will result in a tremendous discharge through the valve, and this sudden impulsive action of the gas acting against the resisting set of wings 36—36, will exert the post 30 to rotate and impart through the gear 26 and teeth 25, rectilinear motion to the bolts 21, obviously retracting the same from the recess 20 in the valve element 15.

As is clearly shown in Fig. 3, the coiled spring 37, interposed between the follower 14 and the valve element 15 is normally compressed, and when the valve element 15 is released, the spring will almost instantly urge the same to the position shown in Fig. 4 where the passageway 17 through the valve will be closed.

For re-setting the valve element 15, a spider construction 38 is mounted upon the shell 8 and secured thereto by screws 39. This spider 38 supports the feed screw 40, which is adapted to be fed by the nub 41 provided with the hand wheel construction 42.

When the valve is in the position shown in Fig. 4, the operation of re-setting the same is performed as follows: The screw 40 is fed downwardly so that its lower end will seat in the concavity 43 of the upper end of the valve element 15. By now feeding the screw 40 downwardly, the valve element will be shifted downwardly against the tension of the spring 37 until the recess 20, reaches a point opposite the inner end of the bolt 21, whereupon the post 30 is rotated by engaging the wrench with the portion 32 of its shaft extension 31, which results in the sliding of the bolt 21 so as to engage with the valve element.

Manifestly, a valve constructed in accordance with the foregoing specification, will be far more quick-acting and practical in use than the devices now in use to fill the capacity hereinbefore specifically stated.

Furthermore, while the foregoing specification has set forth the invention in detail, it is to be understood that numerous changes in the shape, size and materials may be resorted to without departing from the spirit and scope of the invention as claimed hereinafter.

Having thus described, my invention, what I claim as new is:—

1. A valve of the character described comprising a shell, a vertically movable valve element in the said shell, a horizontal passageway through the shell, a vertical shaft across the passageway, wings on the shaft, a spring for normally urging the valve element upwardly to a closed position with respect to the passageway, and a trigger engageable with the said valve element and adapted to be operated by the said shaft.

2. A valve of the character described comprising a shell, a vertically movable valve element in the said shell, a horizontal passageway through the shell, a vertical shaft across the passageway, wings on the shaft, a spring for normally urging the valve element upwardly to a closed position with respect to the passageway, a trigger engageable with the said valve element and adapted to be operated by the said shaft, and means for adjusting the tension of the said spring.

3. A valve of the character described comprising a shell, a vertically movable valve element in the said shell, a horizontal passageway through the shell, a vertical shaft across the passageway, wings on the shaft, a spring for normally urging the valve element upwardly to a closed position with respect to the passageway, a trigger engageable with the said valve element and adapted to be operated by the said shaft, and means for re-setting the said valve element.

4. A valve of the character described comprising a shell, a vertically movable valve element in the said shell, a horizontal passageway, wings on the shaft, a spring for normally urging the valve element upwardly to a closed position with respect to the passageway, a trigger engageable with the said valve element and adapted to be operated by the said shaft, means for re-setting the said valve element, said means for re-setting the valve element comprising a feed screw feedable through the upper portion of the shell, means for feeding the said screw whereby it may engage with the valve element and force the same downwardly.

5. A valve of the character described comprising a shell having a passageway therethrough, a transversely extending bore in the said shell intersecting the said passageway, a valve element slidable in the said bore, spring means for urging the valve element to a closed position, a bolt for retaining the said valve element in a retracted position, pressure controlled means for actuating the bolt to release the same from the said valve element under a predeterminedly high pressure, said means comprising an impeller mounted within the passageway, a gear driven by the said impeller, rack teeth on the bolt with which the gear meshes and a spring for urging the said bolt toward the valve element.

In testimony whereof I affix my signature.
DAVID L. BROWN.